United States Patent [19]

Tateno et al.

[11] Patent Number: 5,137,394
[45] Date of Patent: Aug. 11, 1992

[54] HOLLOW STEEL PILE, MANUFACTURING METHOD AND PILE DRIVING METHOD

[75] Inventors: Jiro Tateno; Masaharu Hashimoto; Seiji Satou, all of Tokyo, Japan

[73] Assignee: Kawasaki Steel Corporation, Japan

[21] Appl. No.: 803,703

[22] Filed: Dec. 3, 1991

Related U.S. Application Data

[63] Continuation of Ser. No. 554,079, Jul. 17, 1990, abandoned, which is a continuation of Ser. No. 253,251, Oct. 4, 1988, abandoned.

[30] Foreign Application Priority Data

| | | | |
|---|---|---|---|
| Oct. 5, 1987 | [JP] | Japan | 62-251381 |
| Nov. 13, 1987 | [JP] | Japan | 62-286855 |
| Nov. 13, 1987 | [JP] | Japan | 62-302492 |
| Mar. 4, 1988 | [JP] | Japan | 63-50715 |

[51] Int. Cl.$^5$ ............................................. E02D 5/56
[52] U.S. Cl. ........................................ 405/232; 299/87; 175/394; 405/231
[58] Field of Search ............... 405/232, 231, 229, 253, 405/250, 251, 240, 241, 242; 175/323, 394, 396; 299/87

[56] References Cited

U.S. PATENT DOCUMENTS

| | | | |
|---|---|---|---|
| 109,337 | 11/1870 | Moseley | 405/253 X |
| 4,156,471 | 5/1979 | Wagner | 175/394 |
| 4,402,371 | 9/1983 | Rocchetti | 175/394 X |
| 4,657,441 | 4/1987 | Horvath | 405/254 |
| 4,708,530 | 11/1987 | Faber | 405/253 X |

FOREIGN PATENT DOCUMENTS

| | | | |
|---|---|---|---|
| 263698 | 3/1929 | Italy | 405/253 |
| 0095716 | 7/1980 | Japan | 405/231 |
| 0054127 | 3/1983 | Japan | 405/231 |
| 0204222 | 11/1983 | Japan | 405/253 |
| 62-86224 | 4/1987 | Japan . | |
| 62-86225 | 4/1987 | Japan . | |
| 62-86227 | 4/1987 | Japan . | |
| 86047 | 8/1957 | Netherlands | 405/253 |

*Primary Examiner*—Dennis L. Taylor
*Attorney, Agent, or Firm*—Austin R. Miller

[57] ABSTRACT

In the present invention are disclosed a hollow steel pile having an open extremity end with a helical projection composed of a round rod or rectangular rod of its height less than 20 mm arranged at an outer circumference of the pile or at both outer circumference of the pile and inner circumference of the pile at a length part less than ten times of s diameter of the pile, a method for fixing the inner circumferential projection and a pile execution method using such a pile as above. This hollow steel pile may preferably be used as a friction pile and a supporting pile, no vibration and noise are found during its execution of work, a better workability is assured, a cost of execution of work is less expensive and this process is suitable for performing in a narrow site.

4 Claims, 10 Drawing Sheets

HOLLOW STEEL PILE, MANUFACTURING METHOD AND PILE DRIVING METHOD

This application is a continuation of application Ser. No. 07/554,079, filed Jul. 17, 1990, now abandoned which is a continuation of application Ser. No. 07/253,251 filed Oct. 4, 1988, now abandoned.

FIELD OF THE INVENTION

This invention relates to a hollow steel pile having open ends, and more particularly a hollow steel pile, a method of execution of work for a hollow steel pile, a device for forming an inner spiral rib at an end of the hollow steel pile and a method for forming the spiral rib by utilizing a spiral rib forming device.

PRIOR ART

As an initial bearing pile, it is well known to provide a precast concrete pile of prestressed concrete or reinforced concrete of a monkey direct driving type. Its execution of work requires a large-sized machine which may provide a substantial influence to the surrounding neighborhood such as noise and vibration. It is sometimes found that there is a housing area where such machine can not enter, resulting in high cost of work.

It is a drilling type of hollow steep pile having open ends that eliminates the above-mentioned disadvantages completely. The hollow steel pile can be settled in the ground through a rotary press-in method. The hollow steel pile is provided with saw-teeth at its ends or with a cutting tool at the end of the steel pipe and the pile is held at its head by a rotary device and twisted into the ground through rotational force. As a foundation pile capable of performing to facilitate the above-mentioned twisting or screwing, a hollow steel pile having at its end or intermediate part some excavation vanes or screws also at the outer periphery or inner periphery of the hollow steel pile having open ends is already disclosed in Japanese Patent Laid-Open No. 62-86224 and the like.

In the disclosure screw vanes are provided at the end of the hollow steel pile as well as at the circumferential surface of an intermediate part; the pile is held at the head by the rotary device and is settled into the ground with a weight of the device and the rotary pulling action of the screw vanes. Further, the peripheral surface of the main body of the pile is formed with one or a plurality of helical bands to cause the bearing area of the pile to be increased and the ground around the pile is press fitted by the helical bands, so that it is expected that the bearing force for the pile is increased and the stability of the pile becomes superior.

In view of the above-described arrangement, the following disadvantages are found in its practical operation.

i) When the pile is rotated with the excavation vanes arranged at the inner circumference and the outer circumference of the pile, the pile may excavate the stratum and advance in it due to its own weight and then the pile penetrates into the ground automatically like a screw nail, although it shows a certain problem in realizing a bearing force after its penetration into the ground. That is, the above-mentioned excavation vanes are designed to have plate-like forms and a wide width just like a cutting blade by evaluating its excavating capability, so a speedy excavation of the stratum can be realized, although the outer and inner surface soils of the pile are peeled off and discharged. Such a soil discharging action is quite important not only due to requiring its processing but also due to a rough or close condensation of the stratum bearing the pile. A substantial number of days is required for the disturbed stratum to recover its density and the present situation shows that a substantial time is required for recovering a frictional force at the circumferential surface for sustaining the bearing force and a sufficient bearing force can not be attained.

ii) As described above, manufacturing and fixing of the excavation vanes formed like a wide plate so as to enable a desired strength to be attained thereby may naturally result in a quite high cost production.

iii) Arranging of the excavation vanes at an intermediate part of the pile is also considered, although the intermediate vanes may act as a resistance against a negative friction so that pile strength becomes a problem.

An actual survey of the pile shows that a monkey direct driving pile is acknowledged to have an excessive bearing force caused by elapse of time, although in case of a rotary pressing-in pile, the increase of the bearing force caused by elapse of time is not acknowledged. This is due to the fact that the friction force of the ground to be born by the main body of the pile is reduced with the cutting blades projected from the peripheral surface of the pile, though the blades are applied in view of execution of piling work with low noise, low vibration and high speed operation. A substantial number of days is required for recovering the disturbed ground.

As another way of execution of work for accommodating the above-mentioned bearing force and performing the work with lower noise, low vibration and speedy operation, there is provided an internal excavation method which can be applied to the hollow steel pile.

This internal excavation process is applied to a stratum having an intermediate sand layer having a relative high N-value until the pile reaches the bearing stratum. The pile to be used in this process is limited to one having a hollow circular section in view of the feature, wherein a spiral auger is inserted into the hollow part and the pile is settled down to the desired depth by its own weight and a pressing-in device while the excavated soil is discharged from the pile head through the hollow part of the pile. After the pile has reached the desired depth, the pile is penetrated into the bearing layer so as to realize the bearing force. As the bearing force realizing process, there are three types including:
1. pile driving process,
2. consolidation process of foundation and
3. enlarged consolidation process of foundation.

The pile driving method has the problem of noise and vibration and the consolidation method of foundation has the problem in which the end bearing force is lower than that of the driving pile; in particular in case of a hollow steel pile, the sectional area of the pile itself is small, adhesion of the consolidation concrete to the pile wall becomes insufficient due to presence of the excavated soil adhered to the inner surface of the pile with resulting problem in the bearing force. A method overcoming disadvantage is an enlarged consolidation method of foundation. However, in this case a special auger head is used and requires a bottom enlargement excavation process. It further has disadvantages that slime from the lower part of the consolidation concrete of the foundation can not be removed completely and much time is required to set the concrete.

Since the hollow steel pile has open ends, the soil is filled within the pile. The amount of soil introduced into the pile is limited by frictional resistance between the inner wall of the pile and the soil, which restricts the penetration speed of the pile. Although a certain range of frictional resistance of the inner wall of the pile (in general less than about 2 times the diameter) effectively contributes to the bearing force near the end of the pile, the frictional resistance of the inner wall of the pile of the in-pile soil more the height becomes a resistance when the pile is penetrated so as to reduce the pile penetration speed. To promote the penetration speed, a spiral rib is provided at the inner circumference of the end of the pile. Means for carrying out an automatic operation to fix an inner rib inside a pipe is proposed in Japanese Utility Model Publication No. 53-24092 and Japanese Patent Laid-Open No. 51-107262 or the like in which the inner rib is welded to the flat steel plate in advance, then the flat plate is rolled into a plate-rolled pipe.

SUMMARY OF THE INVENTION

It is an object of the present invention to provide a hollow steel pile which can perform a clean execution of work under proper penetration torque and have a substantial bearing force.

Another object of the present invention is to provide a steel pipe pile sufficiently consolidated for the foundation against the bearing stratum under an effect of screwing operation of the inner wall and at the same time a friction is generated between the soil column in the pipe kept at a proper consolidated state and the inner wall, resulting in a higher bearing force irrespective of the simple and easy execution of the work.

It is a further object of the present invention to provide an easy and economical means capable of forming an automatic and mechanical fixing of the inner spiral rib at the end of the already-formed steel pile, even a small diameter pile.

In order to accomplish the above described objects, the present invention has been proposed in view of the above-described circumstances and its main gist consists in a system in which a helical projection composed of a round rod or a rectangular rod with a projection height of 20 mm or less is arranged over a length of about 10 times or less of the pile diameter at an outer circumference of the end of a steel pipe pile having open ends, and wherein a projection is also arranged at the inner circumference of the end of the pile.

The present invention has an arrangement in which the inner diameter size of a desired length at the end of the hollow steel pile having open ends is reduced, and the wall thickness of the pipe is made slightly greater.

The inner spiral rib forming device is constructed such that a fixing base frame body is assembled in such a way that it may be moved axially and slidably in respect to the lateral core body and may not be moved axially and circumferentially from a bearing block to be inserted into the end part of the worked and machined steel pipe, the fixing base frame is provided with a plurality of suspended legs having at their ends spiral rib holding rollers in axial spaced-apart relation thereto, a preceding suspended leg pressing part is provided with a torch directed and set, and the opposite sides of the suspended legs are provided with pressing rollers abutting against the inner surface of the hollow steel pile.

The pile driving method of the present invention employing the above-mentioned hollow steel pile is characterized in pressing the pile down to a bearing stratum layer and screwing it into the bearing layer. Another pile driving method is characterized in inserting a spiral auger into a hollow part of the pile, pressing down the pile to a bearing stratum layer while the soil is discharged by the auger head, and then screwing the pile into the bearing layer.

BRIEF DESCRIPTION OF THE DRAWINGS

FIG. 10b is a view taken along the line b—b which appears in FIG. 10a.

FIRST PREFERRED EMBODIMENT

Figure 1:
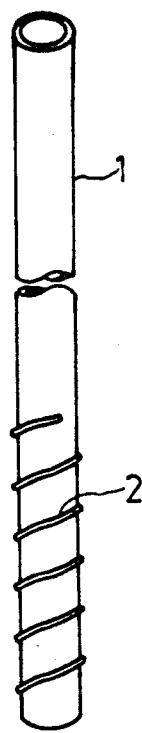
FIG. 1 is a perspective view, with a portion broken away, showing a hollow steel pile constructed in accordance with the present invention.

A first preferred embodiment of the present invention is a hollow steel pile having a helical projection of 20 mm or less in height at an outer circumference at a length part less than 10 times the diameter of the pile. When the rotary pressing-in operation is to be carried out, the soil at the surface of the circumference of the pile is peeled off and is not discharged, which differs from conventional excavation vanes; the surface soil at the pile is broken by the helical projection and is accumulated without being moved at all; a clean pressing-in operation without any discharging any soil is carried out under a depressing action of the soil against the circumferential surface of the pile; a substantial reduction of the disturbance of the stratum enables a reduction of the circumferential surface frictional force and recovering time can be reduced, a sufficient bearing force can be attained, penetration of soil into the pile is promoted without disturbing the surface soil at the inner wall of the pile, the penetration speed is increased and at the same time the inner frictional surface force is increased and a high end bearing force can be realized.

Referring now to the drawings, this embodiment of the present invention will be described in detail.

In FIG. 1, reference numeral 1 indicates a hollow steel pile having open ends and a helical projection 2 composed of a round rod or a rectangular member with a projection height of 20 mm or less welded to the outer circumference of the end of the pile over a length of about 10 times or less of the pile diameter.

The length of the helical projection 2 is preferably short as an excessive length may cause the torque in performing the rotary pressing-in operation to be increased uselessly and to delay the penetration time and further may increase the degree of disturbance of the ground and require a long period of time for recovering the frictional pile force at its circumferential surface.

However, too short a length of the projection 2 may not provide any excavation function or circumferential friction resistance force.

The above-described helical projection range is provided in reference to various experiments and studies. As regards the above-mentioned projection height, the fact that the pile bearing force is substantially influenced in response to the height of the projection as well as the frictional resistance force recovering time after penetration has been confirmed as a result of loading tests and this shows that the greater the projection height, the better the result.

However, the torque when the pile penetrates is excessively increased.

As a result of performing various experiments and studies on such heights as enabling an effective bearing force to be attained within a range not increasing the torque when the pile is penetrated, the above-described range has been provided.

In penetrating a sand layer, the frictional surface is the outer circumferential surface of the pile and even if a slight projection height is used it may realize a screwing effect, so that a lower projection height is satisfactory and so the discharging soil could be eliminated.

The most important feature of the above-mentioned disclosure consists in the fact that the excavation vanes are made of round rod or rectangular rod and in addition it results in less cost, a provision of the associated strength with simple welding work and economical effectiveness. As a result, it has been proposed to provide a hollow steel pile for use in rotary pressing-in work which is effective in its realization of workability and bearing force by restricting the associated range of the helical projection 2 to the end and also limiting the height of its projection.

Figure 2:
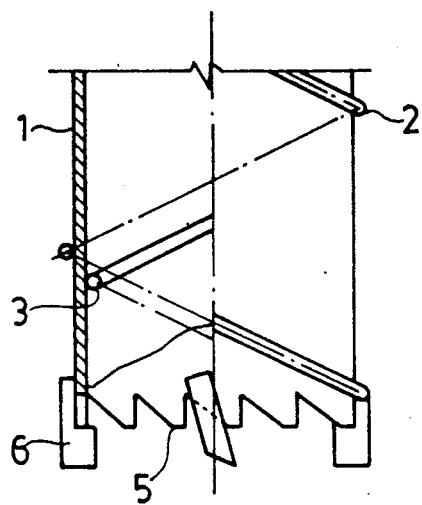
FIG. 2 is an enlarged detail view showing an end of the hollow steel pile of the present invention.

As shown in FIG. 2, it is effective to provide a helical projection 3 within the pile in case the pile is to be penetrated into a hard stratum and the penetration time is extended; the in-pile screw thrust force may shorten the penetration time. In addition, after penetration, the projection 3 may increase the frictional resistance force against the soil within the pile and a bearing force at the end of the pile is provided.

In-pile screw projection 3 is required to be attached in a range more than at least two times or more of the diameter where the load at the end may act to increase the load at the side wall of the end of the pile. Further, the projection 3 is attached at a length in the range more than five times the diameter of the pile in order to realize the effect of a screw. Further, the helical shape as well as the pitch of the helical line and its length is not necessarily the same as that of the outer projection 2 and its selection may influence the penetration speed torque.

Figure 3:
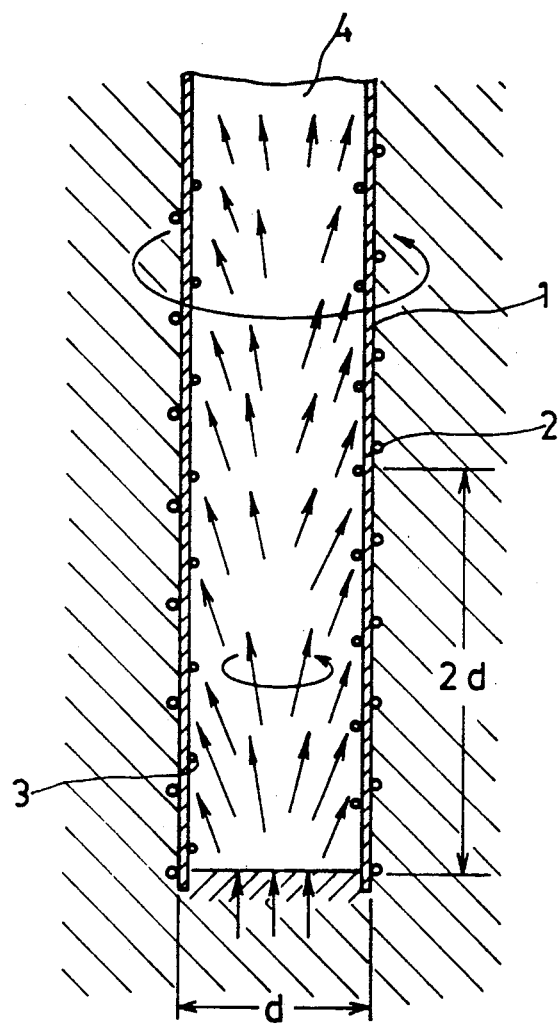
FIG. 3 is an illustrative view showing a penetration mechanism for soil into a pile of the present invention.

As shown in FIG. 3, the penetrating soil 4 in the pile 1 has a sliding action at the end of the pile and the in-pile soil 4 may accept a transmittance of torque from the end, generates a relative speed between the pile 1 and the in-pile soil 4 and then penetrates into the pile while being rotated. The in-pile soil column 4 is rotated to reduce dynamic frictional resistance at the inner surface of the pile and is pushed up with a screw thrust and with a load at the extremity end generated as the soil is rotated.

In addition to the above-mentioned disclosure, as shown in FIG. 2, if the end of the pile 1 is made as a saw-tooth 5 or is provided with a bite 6 for excavating a width corresponding to the total of projections 2 and 3 and the pipe wall thickness, the penetrating efficiency of the structure is improved more.

Turning now to an example, work was performed with a pile having helical projections with a pitch of 300 mm and a height of 13 mm at both inner and outer surface at the end 3m of a pile having a diameter of 300 mm. The pile was penetrated down to a depth of 21 m at the stratum with an N-value of 50 in about 60 minutes. No discharging soil was found at all.

As regards the test results of vertical loading tests, a desired withstand load was attained. Effects attained with the above-mentioned inner screws of the pile will be described as follows. A comparison of penetration speed at a stratum with an N-value of 30 will be expressed as the amount of penetration per single rotation of the pile, as follows

| Penetration Speed | Inner screw is present | Inner screw is not present |
|---|---|---|
| Sand Layer N = 30 | 33.2 mm/r | 25.5 mm/r |
| Clay Layer N = 10 | 52.0 | 43.3 |

As described above, the inner screw is particularly effective at a sand layer having a long penetration time and further it is confirmed that the total penetration time can be reduced with its use.

SECOND PREFERRED EMBODIMENT

A second preferred embodiment of the present invention provides a hollow steel pile having a reduced size open end. The end bearing force is maintained with the end frictional force increased by a narrowed spacing, the entered soil at the small diameter part of the pile is loosely passed at the large inner diameter part to reduce the inner wall friction of the penetrated soil, and penetration of the pile is improved to reduce a desired torque when screwed.

Figure 4A:
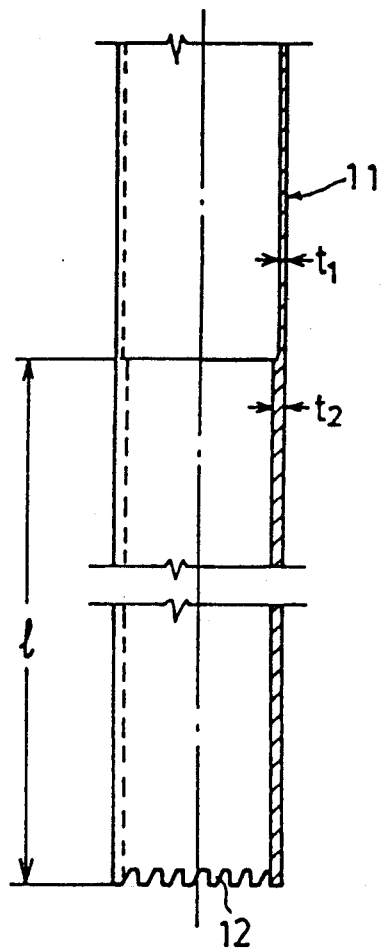
FIGS. 4a and 4b are longitudinal sections showing hollow steel pile of the present invention.
Figure 4B:
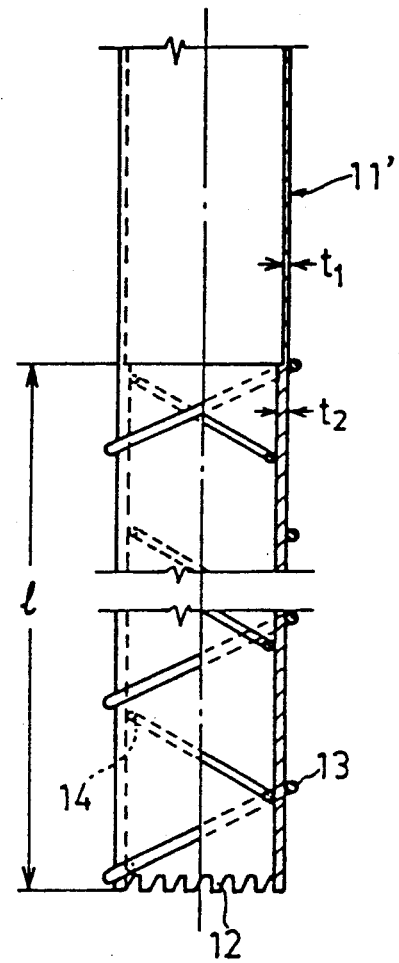

FIGS. 4a and 4b are a longitudinal section for showing a steel hollow pile of the present invention, wherein FIG. 4a indicates a case in which the helical projection composed of a round rod or a rectangular rod is not provided and in turn FIG. 4b indicates a case in which both helical projections 13 and 14 are provided.

In case of the hollow steel piles 11 (FIG. 4a) and 11' (FIG. 4b), as shown in the drawings, the inner diameter of a desired length l at the end is smaller and the pile wall thickness $t_2$ only at this portion is slightly greater than the pile wall thickness $t_1$ at the other part of the pile.

The reference numeral 12 denotes saw-teeth. However, in case of the system shown in FIG. 4a, the penetrated soil in the pile is cut at a smaller diameter than that of the conventional system and the inner wall friction of the penetrated soil is reduced and thereby the required torque is also reduced.

As a result of penetration tests of the pile, it has been found that the maximum torque of the pile of the present invention is substantially lower than that of the conventional pile. Test results of a pile having a diameter of 300 mm is indicated in the following table.

| Comparison of Maximum Torque | | |
|---|---|---|
| Pile of the Present Invention | $t_1 < t_2$ | $T = 8^{t-m}$ |
| Normal Pile | $t_1 = t_2$ | $T = 10^{t-m}$ |

It has been confirmed that a narrow inner diameter of the pile end causes the frictional resistance force at the end to be increased, and result of load tests shows sufficient bearing force.

In FIG. 4b, the hollow steel pile 11' has a helical projection 13 composed of a round rod or rectangular rod having a height of 20 mm or less which is welded at the outer circumference of the pile end over a length of less than ten times the diameter of the pile.

As regards the attached length of the above-described helical projection 13, if the length is too long, the torque required for use in performing a rotary pressing-in operation is increased uselessly to delay the penetration time and to increase disturbance of stratum as well as to require a longer period of time for recovering the frictional resistance force at the circumferential surface, so that the shorter length is preferable.

However, too short a projection length may not provide enough excavation capability or enough resistance force at the circumferential surface.

As regards the above-mentioned projection height, it has been confirmed from a result of load test that the bearing force of the pile is substantially influenced in response to the projection height in view of the frictional resistance force recovering time after penetration, and further it has been found that the greater the projection height, the better the bearing force.

However, in other cases the torque when the pile is penetrated becomes excessively high. As a result, a hollow steel pile for use in performing a rotary pressing-in process which is effective and economical in realizing workability and a bearing force has been provided by a method wherein an attaching range of the helical projection 13 is limited to the end of the pile and also its projection height is limited.

In case the pile is to be penetrated into a hard stratum and its penetration time is extended, it is effective to provide the helical projection 14 in the pile, and its in-pile screw thrusting force may reduce the penetrating time. In addition, after penetration, the internal projection 14 may increase the frictional resistance force against a soil in the pile and produce the bearing force at the end of the pile.

The in-pile screw projection 14 is required to be attached at a range at least more than two times diameter where the load at the pile end may act to increase the load at the side wall of the end of the pile and in order to realize the effect of a screw, the projection is attached for more than five times of the diameter. The shape of the helical part as well as the helical pitch and the length of the helical part may not necessarily be the same as that of the outer projection, although their selection may influence the penetration speed or torque.

Figure 5:
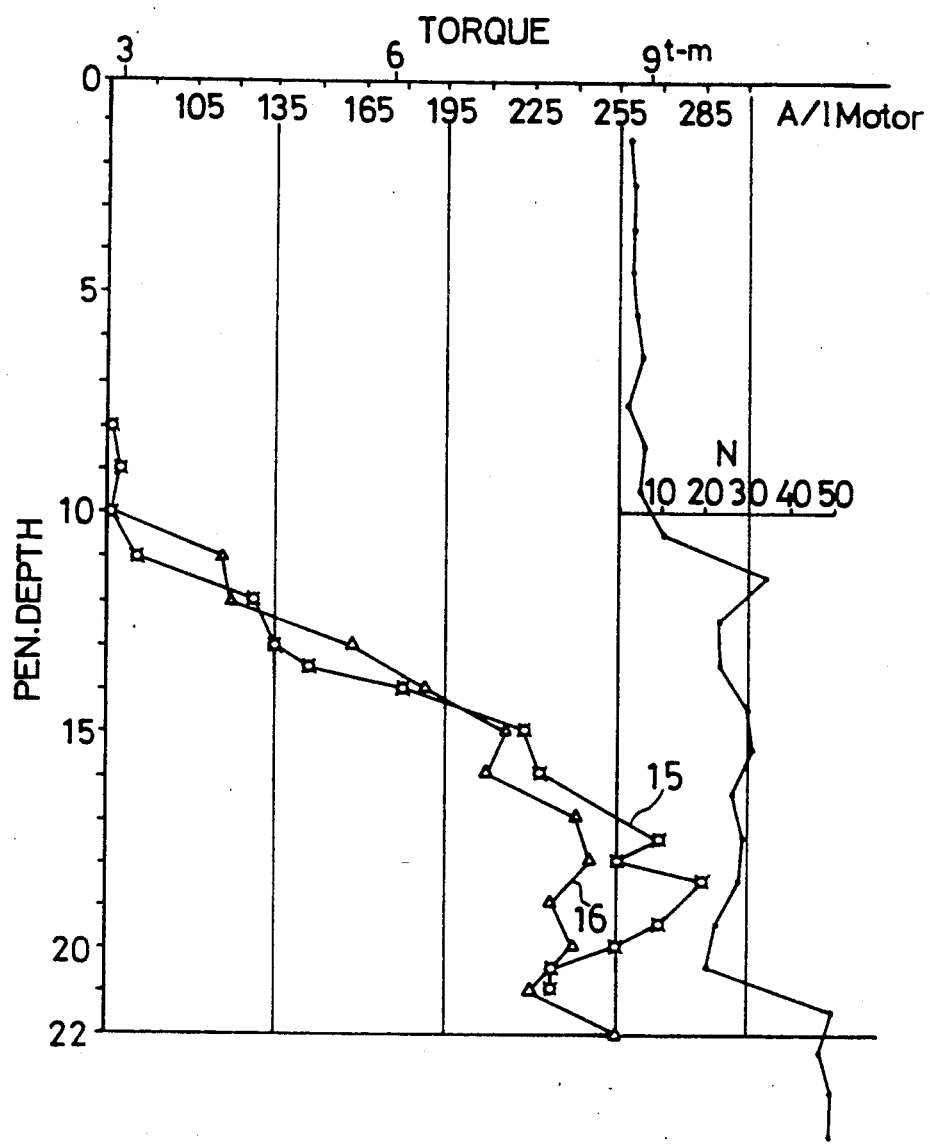
FIG. 5 is a relative diagram showing a relation between penetration torque and wall thickness.

In FIG. 5 is illustrated a difference of penetration torque in each of the piles having projections 13 and 14 between one having a pile wall thickness at the end of the pile slightly thick as disclosed in the present invention and the other having no such thick pile wall portion.

The line 15 in FIG. 5 indicates a case of a hollow steel pile in which a projection 13 having a pitch of 300 mm and a length of 3,000 mm is arranged on the outer circumference of the end of a steel pile having the same wall thickness, as an example of comparison, and a projection 14 having a pitch of 300 mm and a length of 3,000 mm arranged at the inner circumference of the steel pile. The line 16 in this figure indicates the arrangement of the present invention in which the same projections 13 and 14 as described above are arranged on a pile having a small inner diameter at the pile end and a thick wall at the pile end.

In this figure, it is disclosed that the torque is reduced.

Figure 6:
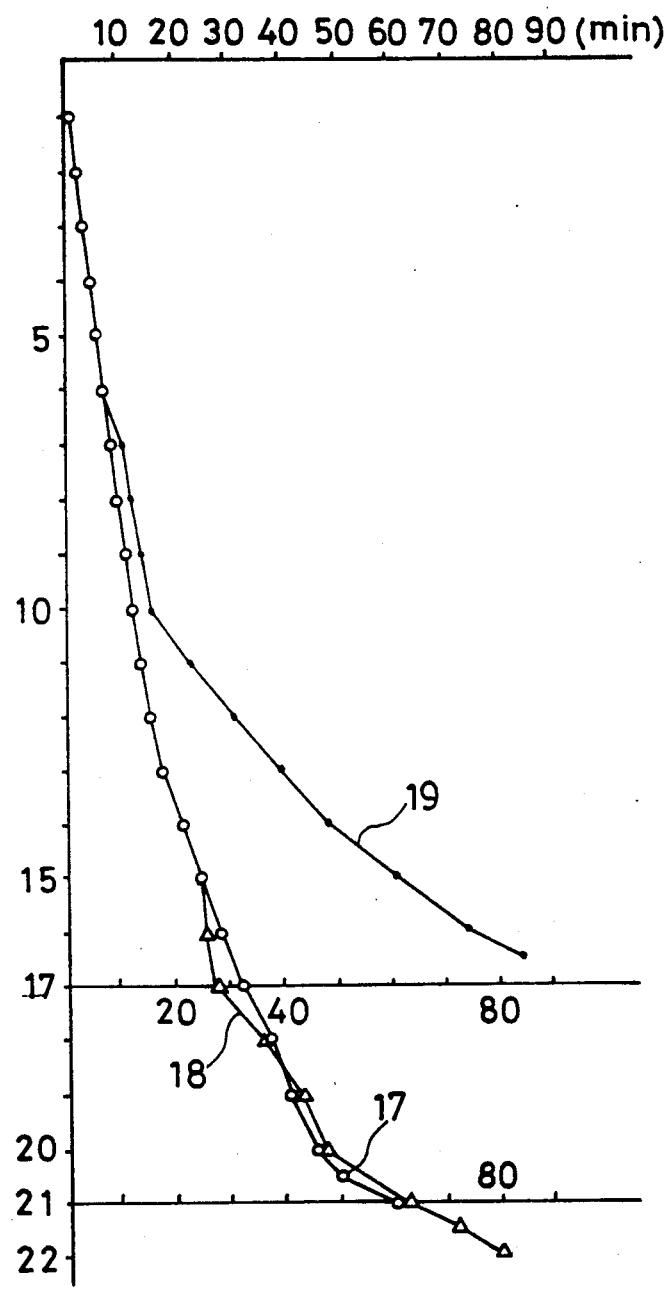
FIG. 6 is a relative diagram showing a relation between penetration speed and the threaded projection in the pile.

Then, in FIG. 6 is illustrated a relation between length of the projection 14 and penetration speed.

Lines 17 and 18 in the figure correspond to the lines 15 and 16, and the line 19 corresponds to one in which the projection 14 of the lines 15 and 17 is reduced to a length of 1,500 mm, or half of the former one. It is apparent that the length of the projection 14 may remarkably influence the penetration speed.

THIRD PREFERRED EMBODIMENT

A third preferred embodiment of the present invention provides a pile driving method employing a hollow steel pile, especially in the case of applying an internal excavation process. A spiral auger is inserted into a hollow part of the hollow steel pile, the pile is settled down by its own weight and a pressing-in device while the excavation and soil discharging are being carried out by the auger head, and upon reaching the bottom, the required length of the pile is screwed into and penetrated into the desired stratum. Thereby a high frictional resistance is generated between the pile penetrated soil column enclosed and restricted and the inner wall surface of the pile through the screw-like projection and when a bearing force which is approximate to the monkey direct driving pile is realized.

Figure 7A:
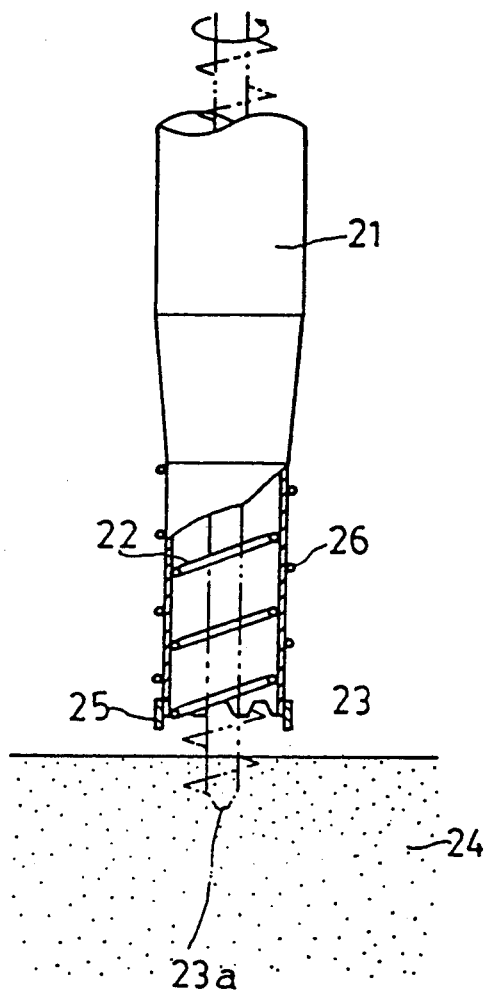
FIGS. 7a and 7b are illustrative views showing screwing and penetration of the hollow steel pile in the process of the present invention.
Figure 7B:
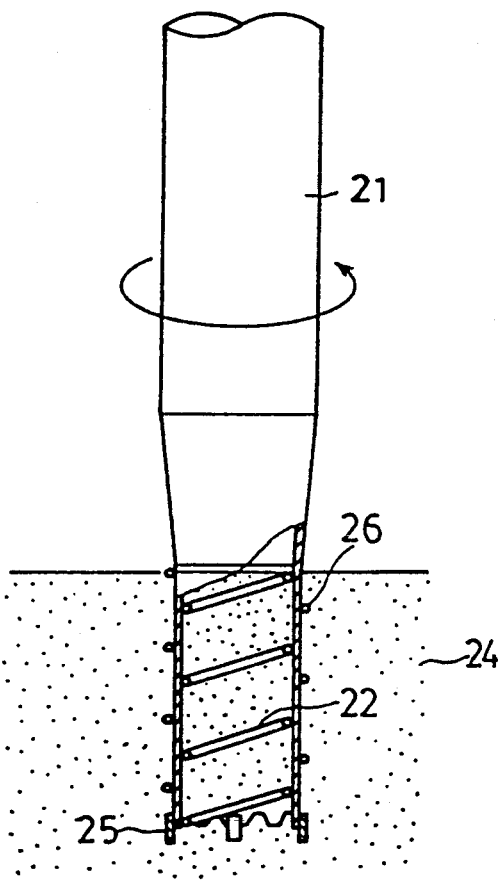
Figure 8:
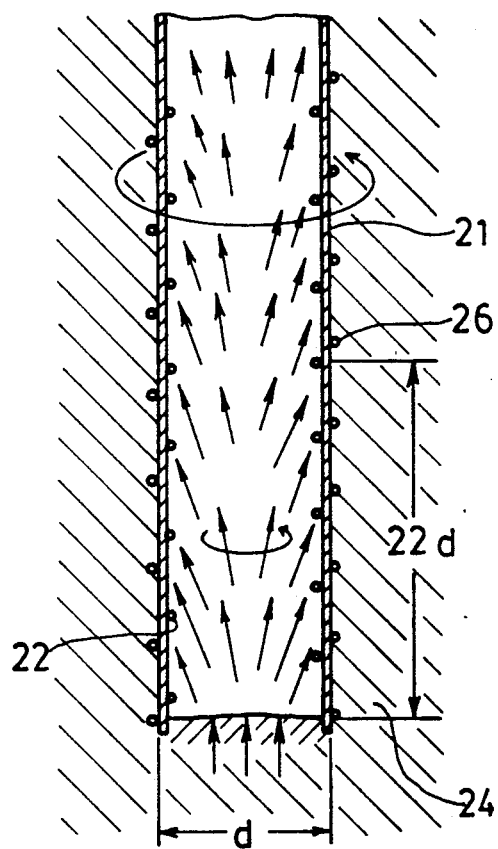
FIG. 8 is an illustrative view showing a penetration mechanism in the pile.
Figure 9:
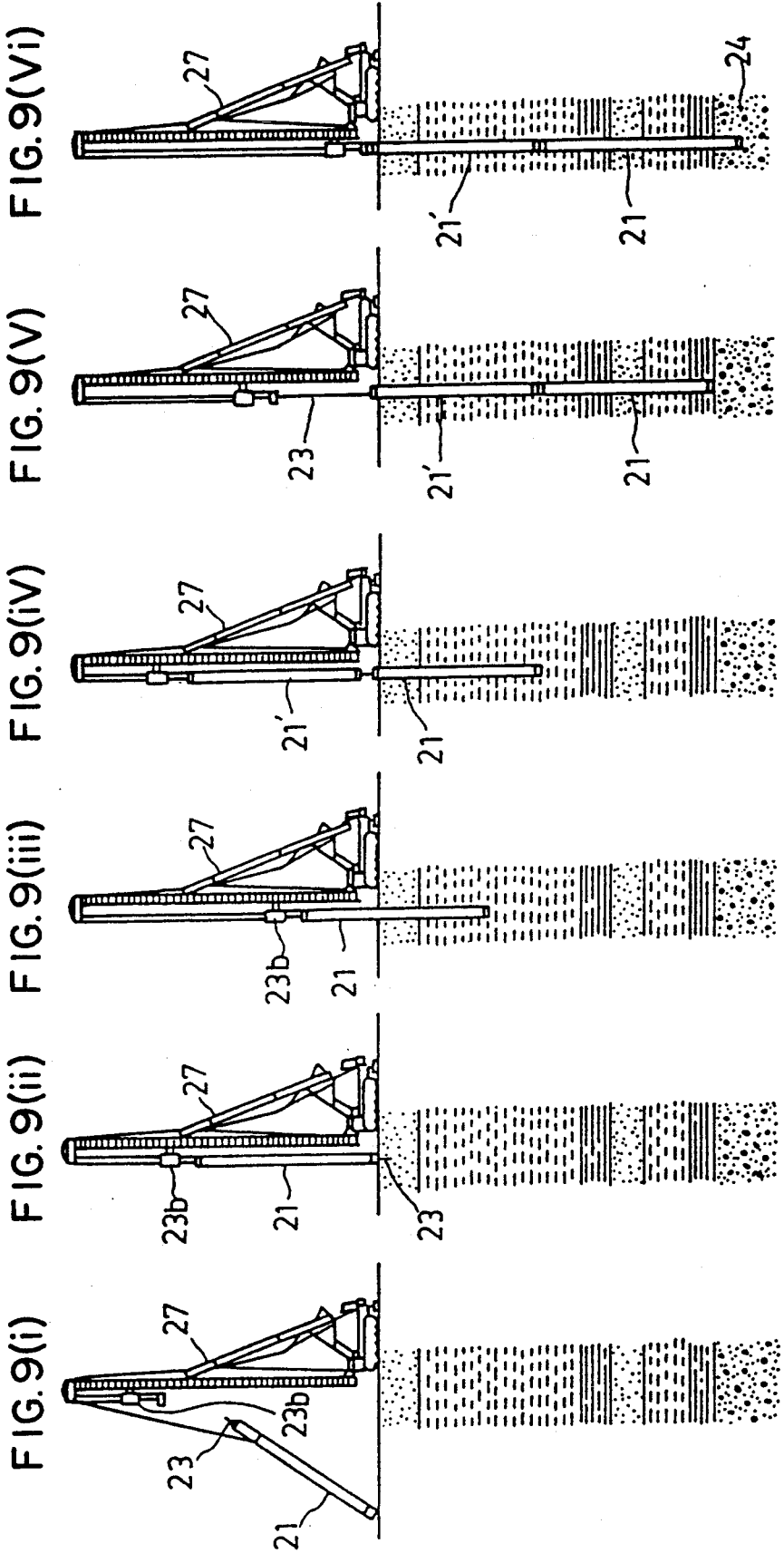
FIGS. 9(i) to (vi) are illustrative views showing an order of method steps.

FIGS. 7a and 7b illustrate a process of screwing and excavation of a hollow steel pile as applied in the work of the present invention in case of performing the internal excavation process together. FIG. 8 illustrates in-pile penetration mechanism in the present invention. FIG. 9(i) to (vi) illustrate the sequence of steps for the case of performing the internal excavation together.

As clearly shown in FIG. 7a, a hollow steel pile 1 used in the execution of work of the present invention has a screw projection 22 on the inner wall of the end of the pile. The screw projection 22 is constructed such that an iron bar is normally welded in a spiral form. As another alternative projection, a projection is provided at the stage of plate rolling and a screw projection is applied. A spiral auger 23 is inserted into the hollow steel pile 21 and settled down by the weight of the pile itself and a pressing-in device while being excavated and discharging down to the desired stratum acting as a bearing layer 24 by the auger head 23a.

In the drawing, the reference numeral 25 denotes a friction cutter, and the reference numeral 26 denotes a screw projection arranged on the outer surface of the pile. Although the hollow steel pile 21 shown in the drawing is illustrated as having a stepped form which is connected to a cylindrical part having a small diameter through a metering part, a normal straight cylinder form may also be applicable After settlement as shown in FIG. 7a, the pile 21 is screwed and penetrated into the bearing stratum 24 by a desired length with an auger drilling machine. (FIG. 7b)

A screw effect or the inner part of the pipe in FIG. 7b and the penetrating mechanism will be described. In order to penetrate the pile into the desired depth, it is necessary to penetrate the soil at the end of the pile smoothly into the pipe from the end of the pile The soil entering into the pile from the end is pushed up in sequence by the load at the end of the pile and the screw thrusting force in the pile The pile is rotated at a faster rate than that corresponding to the screw pitch and the penetration speed and results in a sliding movement at the end of the pile, the soil in the pile transmits a torque from its end to generate a relative speed between the pile and the soil in the pile and the pile penetrates into the soil while being rotated. The soil column in the pile makes a frictional resistance at the surface of the pile as a dynamic friction resistance as the pile is rotated and the soil in the pile is pushed up by a screw thrusting force and a load at the end of the pile generated as the pile is rotated.

In FIG. 8 is illustrated the above-mentioned in-pile penetration mechanism. As the load at the end of the pile is increased, transmittance torque is also increased and at the same time resistance of the inner wall at the end of the pile is increased, so that the increasing of the load at the end of the pile does not effectively act against penetration of the soil into the pipe.

Thus, it is an essential feature of the method of the present invention to transmit a torque to a soil column in the pile under a certain proper load at the end and to penetrate the pile into the soil The screw projection in the pile is required to be attached in a range at least more than two times of the diameter d to which the load at the end may act to increase the load at the end of the pile.

The screw projection arranged at the outer surface of the pile may cut the ground to excavate the stratum out of the outer circumference of the pile upwardly Thus, the projection attached to the outer circumference of the pile is not necessarily a spiral iron rod and it is sometimes provided in the form of only a friction cutter at the end of the pile. However, provision of a spiral iron rod over a certain length of the end of the outer circumference of the pile enables the required torque generated during its penetration to be decreased, and after penetration work, it may increase the friction resistance force between the bearing layer and the outer circumference of the pile and realize the bearing force.

In reference to FIG. 8, an order of steps of the method will be described.
(i) A spiral auger 23 is inserted in advance into the hollow part of the pile 21 and assembled to the pile driving machine 27
(ii) The spiral auger 23 is connected to the auger driving device 23b, its vertical orientation is assured and excavation is started.
(iii) The spiral auger 23 is rotated and the pile 21 is settled down while the stratum facing to the extremity end of the pile is being excavated.
(iv) The pile 21 is settled down to a position as one where a coupling welding work may not be hindered. After the pile 21' having the spiral auger 23 inserted is assembled in the same manner as that of (i) and the upper and lower spiral augers 21, 21' are connected to each other, the coupling of the pile is welded in such a way that its axis is a straight line.
(v) The piles 21, 21' are settled further to the desired depth and then the spiral auger 23 is rotated in an opposite direction and pulled up.
(vi) After pulling off of the spiral auger 23, the pile and the auger drill machine 23b are connected to each other, rotated and pressed in to the bearing stratum 24, and consolidated at the foundation to resist the bearing force.

In case that intermediate sand layer N in the stratum is not high, the intermediate excavation processes of (i) to (v) may be eliminated and the pile and the auger drill machine may be connected first, rotated and pressed in.

A feature of the above-described arrangement of the present invention consists in the fact that the hollow steel pile having a screw projection attached to the inner wall of the end of the pile is screwed into the ground and penetrated into it. With this arrangement, a higher frictional resistance which is different from that of the outside part of the pile is generated between the pile and the penetrated soil enclosed and restricted within the pile, and at the same time the effect of penetration is understood to be increased, so a measurement of comparison has been performed.

Examples of the execution of work of a pile having a size of 400 mm in diameter × 22 m in length are compared with one having an inner wall screw and the other having no inner wall screw.

① One having an inner wall screw at the end of the pile: Screw: Iron rod of 13 mm in diameter welded; Outer circumference pitch of 400 pitch, inner circumference pitch of 400 pitch;
② The other having no inner wall screw at the end of the pile
Screw Iron rod of 13 mm in diameter welded; Outer circumference pitch of 400 pitch

|  | ① | ② |
| --- | --- | --- |
| Required Torque | $4.5^{t-m}$ | $4.5^{t-m}$ |
| Penetration Depth | 16 m | 16 m |
| Penetration Time | 40 min | 60 min |

As described above, it is apparent that the penetration time can be shortened under the effect of a screw at the inner wall.

FOURTH PREFERRED EMBODIMENT

Figure 10:
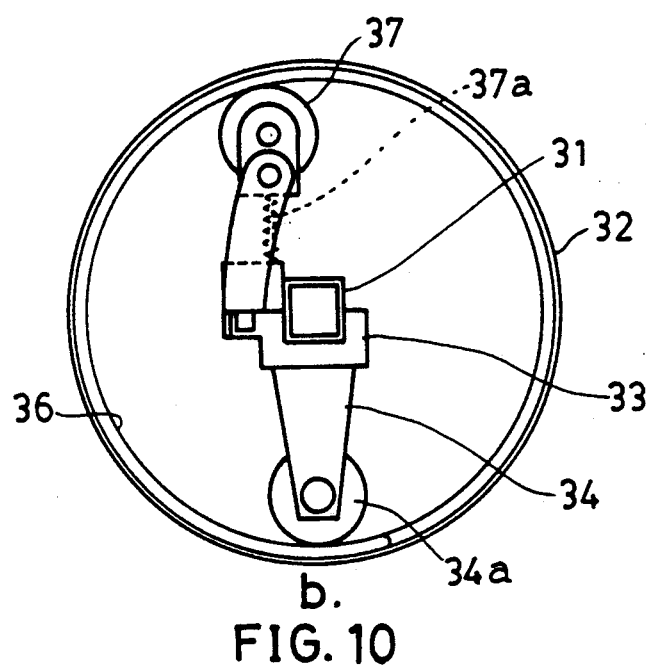
FIGS. 10a and 10b are an illustrative views showing modes of use of the device of the present invention.
Figure 10:
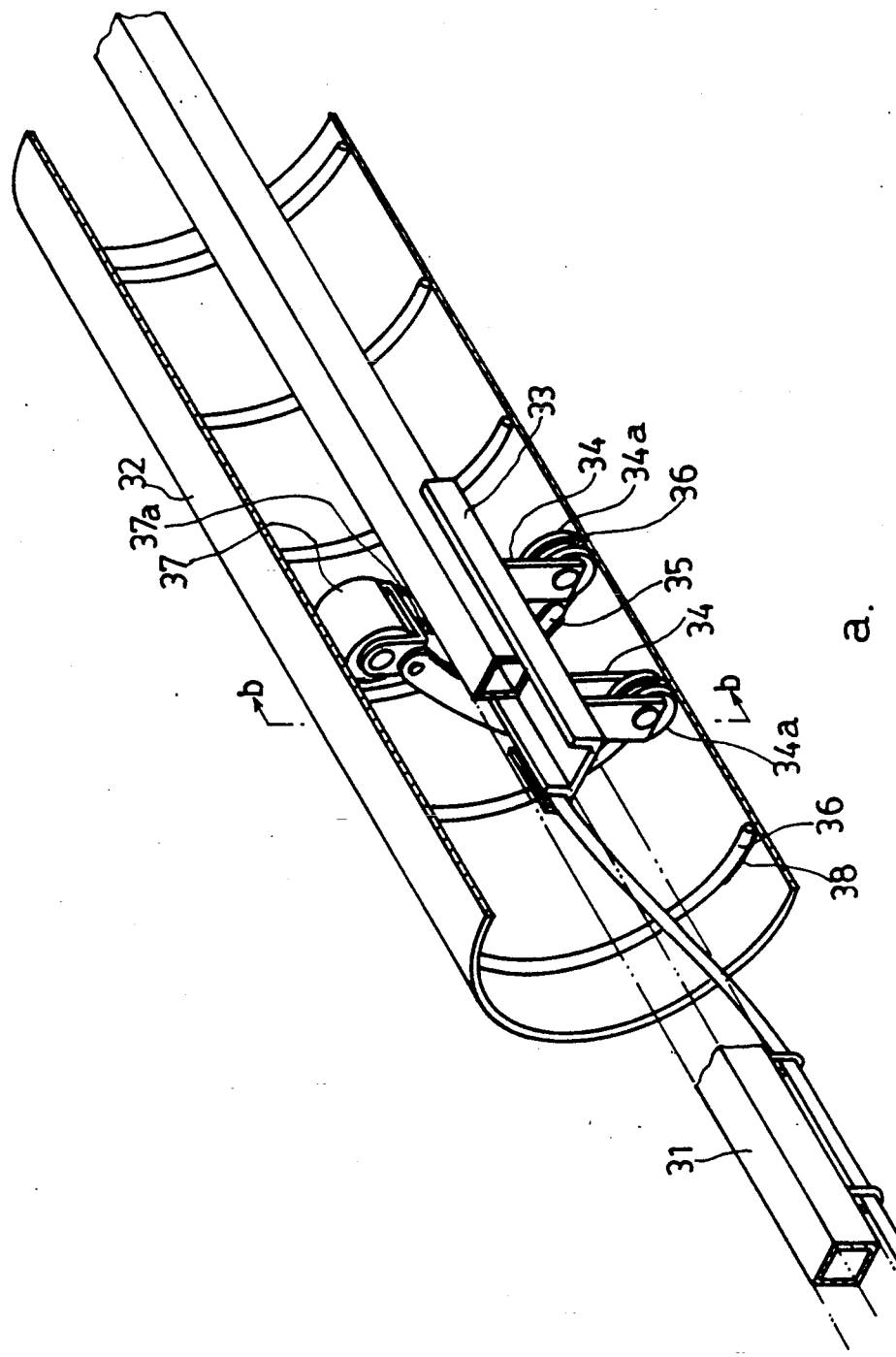

Referring now to the drawings, a fourth preferred embodiment of the present invention will be described. FIGS. 10a and 10b are an illustrative views for showing a state of use of the device of the present invention. FIG. 10a is a view taken along a of FIG. 10a.

In the drawings, a reference numeral 31 designates a lateral core body inserted into an end of a machined and preformed steel pipe 32. Core body 31 is composed of a rectangular steel pipe and the like which is projected out of a fixed supporting table not shown. To this lateral core body 31 is assembled a fixing base frame 33 which can be axially slid along the core body 31 and is not rotatable in a circumferential direction.

The fixing base frame 33 is provided with a plurality of suspending legs 34, ..... with a desired spacing (a spiral pitch) in an axial direction, and the ends of the suspending legs 34 are provided with spiral rib holding rollers 34a.

From the fixing base frame 33 is projected a torch 35 and this is directed near the rollers 34a preceding so as to press and set a position of the spiral rib 36 not yet welded as shown.

In turn, at the upper side of the fixing base frame 33, a pressing roller 37 abutting against an inner surface of the steel pile 32 having a pressurizing mechanism such as a spring 37a installed so as to press the rollers 34a against the inner surface of the steel pile 32 is provided.

The rib 36 composed of a round rod or rectangular rod formed in a spiral form in advance is inserted into the end of the already-formed steel pile 32, only the open end where an operator may manually reach is welded at 8 by hand for temporarily fixing and rib 36 is fixed there. The steel pile 32 is mounted on a rotary device such as a turning roller and the like not shown.

The above-mentioned device is inserted into the end of the steel pile 32 maintained in this condition, the rollers 34a hold the spiral rib 36 and the pressing roller 37 is abutted against the inner surface of the steel pile 32.

Thus, the preceding roller 34a holds the rib 36 not yet welded at a desired spiral pitch position in reference to the rollers 34a for holding the rib 36 temporarily fixed to the open end under rotation of the steel pile 32 and at the same time it is welded with the torch 35 at once. The fixing base frame 33 is relatively advanced into the steel pile 32 so as to complete automatically the formation of the spiral rib at the inner surface of the end over a desired length.

Since the torch 35 is required to be compact in size, it is preferable not to provide any flux supplying device and the like, i.e. to use a flux cored wire.

The welding position of the torch 35 is directed downwardly as described above and fixed, and a stable welding can be made. As for the pressing roller 37, it must be considered that a uniform pressing pressure is maintained against a group of rollers 34a and the spiral rib 36 may not act as an inhibitor and so a symmetrical arrangement or a plurality of steps of pressing rollers should be made.

The above-described device is operated such that the rib which is formed in a spiral form in advance is inserted into the end part and only the open end part manually reached is welded by a manual operation and fixed and then inserted into the extremity end of the already formed steel pipe laterally installed on the rotary device. The spiral rib pushed against the inner surface of the steel pile with a pushing force of the pressurizing rollers through the spiral rib holding rollers are welded in sequence through torch as the steel pile is rotated.

In a practical use of the arrangement, an iron rib of 13 mm in diameter was welded to an inner wall of a pile having an inner diameter of 300 mm, a length of 15 m, a length of extremity end of 3000 mm, resulting in that the welding could be performed without any problem and its quality condition was assured.

What is claimed is:

1. A hollow steel support pile having both ends open, and structured to be rapidly driven into soil under low torque conditions with strong soil support and without disturbing surface soil, characterized in that an outer helical projection means composed of a round rod or rectangular rod member having a projection height of 20 mm or less is arranged at an outer circumference of the pile to increase bearing capacity upon driving the pile, said projection extending less than the entire length of said hollow steel pile and having a length, measured along the length of said pile, which is less than 10 times the diameter of the pile, said projection being located substantially at the end of the pile to increase resistance force along the surface of the pile and minimize application of torque upon driving the pile, and wherein an inner helical projection means also composed of a round rod or rectangular rod member having a projection height of 20 mm or less is fixed to the inner surface of the pile and extends through only a part of the pile length from the end of the pile so that frictional resistance force against soil inside the pile is increased and the bearing capacity of the pile is increased in conjunction with the outer projection when the pile is driven.

2. A hollow steel pile as set forth in claim 1 in which a saw-teeth recess and/or a cutting tool is arranged at the end of the pile.

3. A driven hollow steel support pile adapted for rapid, low torque driving without disturbing surface soil and having both ends open, characterized in that an outer helical projection means composed of a substantially round rod or substantially rectangular rod member having a projection height of 16 mm or less is arranged at an outer circumference of the pile, said projection extending less than the entire length of said hollow steel pile and having a length, measured along the length of said pipe, which is less than 10 times the diameter of the pile, said projection being located substantially at the end of the pile, wherein an inner helical projection means also composed of a substantially round rod or substantially rectangular rod member having a projection height of 16 mm or less is fixed to the inner surface of the pile and extends through only a part of the pile length and from the end of the pile so that frictional resistance force against soil inside the pile is increased and the bearing capacity of the pile is further increased in conjunction with the outer projection when the pile is driven.

4. A hollow steel pile as set forth in claim 3 in which a saw-teeth recess and/or a cutting tool is arranged at the end of the pile.

* * * * *

UNITED STATES PATENT AND TRADEMARK OFFICE
CERTIFICATE OF CORRECTION

PATENT NO. : 5,137,394
DATED : August 11, 1992
INVENTOR(S) : Jiro Tateno et al

It is certified that error appears in the above-identified patent and that said Letters Patent is hereby corrected as shown below:

On the title page, item [54] after "PILE", please delete ", MANUFACTURING METHOD AND PILE DRIVING METHOD".

In Column 1, line 1 of the title, after the word "PILE", please delete ", MANUFACTURING" and line 2 of the title, please delete "METHOD AND PILE DRIVING METHOD".

In Column 5, line 65, after "end,", please add --and--.

In Column 9, bridging lines 60 and 61, please delete "extremity".

In Column 10, line 53, before "of", please insert --line b-b--.

Signed and Sealed this

Eleventh Day of January, 1994

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,137,394
DATED : Aug. 11, 1992
INVENTOR(S) : Jiro Tateno, et al

It is certified that error appears in the above-indentified patent and that said Letters Patent is hereby corrected as shown below:

Column 12, line 51, after "A", insert --driven--.

Signed and Sealed this

Twenty-sixth Day of July, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,137,394
DATED : August 11, 1992
INVENTOR(S) : Jiro Tateno et al

It is certified that error appears in the above-indentified patent and that said Letters Patent is hereby corrected as shown below:

In Column 12, line 51, after "A", please insert --driven--.

Signed and Sealed this

Thirteenth Day of September, 1994

Attest:

BRUCE LEHMAN

*Attesting Officer*     *Commissioner of Patents and Trademarks*